US012189727B2

(12) United States Patent
Chen et al.

(10) Patent No.: US 12,189,727 B2
(45) Date of Patent: Jan. 7, 2025

(54) SENSOR WATERMARKING ON RAW IMAGES

(71) Applicant: OmniVision Technologies, Inc., Santa Clara, CA (US)

(72) Inventors: Wenshou Chen, Santa Clara, CA (US); Guansong Liu, San Jose, CA (US); Boyd Fowler, Sunnyvale, CA (US); Ramakrishna Kakarala, Santa Clara, CA (US); Yiyi Ren, Santa Clara, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 502 days.

(21) Appl. No.: 17/478,237

(22) Filed: Sep. 17, 2021

(65) Prior Publication Data

US 2023/0087541 A1   Mar. 23, 2023

(51) Int. Cl.
| | |
|---|---|
| *G06F 15/16* | (2006.01) |
| *G06F 21/16* | (2013.01) |
| *G06F 21/60* | (2013.01) |
| *G06T 1/00* | (2006.01) |
| *H04L 1/00* | (2006.01) |
| *G06F 17/14* | (2006.01) |

(52) U.S. Cl.
CPC ............ *G06F 21/16* (2013.01); *G06F 21/602* (2013.01); *G06T 1/005* (2013.01); *G06T 1/0092* (2013.01); *H04L 1/004* (2013.01); *G06F 17/14* (2013.01)

(58) Field of Classification Search
CPC ........ G06F 21/16; G06F 21/602; G06F 17/14; G06F 1/005; G06F 1/0092; H04L 1/004
See application file for complete search history.

(56) References Cited

U.S. PATENT DOCUMENTS

| | | | | |
|---|---|---|---|---|
| 7,526,099 | B2* | 4/2009 | Kamijoh | G06T 1/0085 382/100 |
| 7,616,777 | B2 | 11/2009 | Rodriguez et al. | |
| 7,644,281 | B2* | 1/2010 | Deguillaume | H04N 1/32203 713/176 |
| 8,023,691 | B2 | 9/2011 | Rodriguez et al. | |
| 8,280,098 | B2* | 10/2012 | Yadid-Pecht | H04N 23/60 348/308 |
| 2002/0016916 | A1* | 2/2002 | Natarajan | H04N 1/32251 713/179 |
| 2003/0187798 | A1* | 10/2003 | McKinley | G08G 1/017 380/54 |
| 2004/0145661 | A1* | 7/2004 | Murakami | H04N 1/32144 348/222.1 |
| 2005/0025337 | A1* | 2/2005 | Lu | H04N 19/467 375/E7.089 |
| 2005/0169499 | A1 | 8/2005 | Rodriguez et al. | |
| 2016/0210717 | A1* | 7/2016 | Adsumilli | H04N 1/32251 |
| 2022/0343026 | A1* | 10/2022 | Yang | G06T 1/0092 |
| 2022/0366522 | A1* | 11/2022 | Itagaki | G06T 1/0042 |

* cited by examiner

*Primary Examiner* — Oleg Survillo
(74) *Attorney, Agent, or Firm* — COZEN O'CONNOR (57) ABSTRACT

A method and apparatus for embedding a digital watermark in image content that is not visible to the human eye is performed on single-sensor digital camera images (often called 'raw' images) from a pixel-array. The raw image is transformed to generate preprocessed image coefficients, a watermark message is encrypted using a first key; the encrypted watermark message is randomized using a second key to form a watermark; and the watermark is embedded in randomly selected preprocessed image coefficients.

18 Claims, 7 Drawing Sheets

SENSOR WATERMARKING ON RAW IMAGES

BACKGROUND

Multimedia data, including images and video, is increasingly used in distributed environments where it is easily shared and transferred between users. In addition to creating issues with copyright protection, this transferability also includes the capability to edit photos in almost undetectable ways. Recently, it has become possible to edit videos as well, which are referred to as "deep fakes." Often this takes the form of replacing one person's likeness with another, although any type of image manipulation may be referred to as a deep fake.

While encryption and other techniques for controlling access may be used to protect digital multimedia, these techniques do not protect the content itself, which may be acquired legitimately before being modified.

Watermarking has long been used on printed documents to discourage counterfeiting. It is also used in digital files, including computer programs and music, for example. For images and videos, a digital watermark may appear as a visible but transparent design that is overlaid on the image or video. While the image is still visible through the watermark, this negatively impacts image quality. A watermark may also be added to the header of a file without impacting image quality, but this may be easily removed, thus defeating its purpose.

SUMMARY OF THE EMBODIMENTS

In a first aspect, a method of embedding a digital watermark in image content so that it is not visible to the human eye is performed on single-sensor digital camera images (often called 'raw' images) from an image sensor having a pixel-array. The raw image is transformed to generate preprocessed image coefficients; a watermark message is encrypted using a first key; the encrypted watermark message is randomized using a second key to form a watermark; and the watermark is embedded in randomly selected preprocessed image coefficients.

In a second aspect, a digital watermarking module includes circuitry for embedding, according to the method of the first aspect, a digital watermark in raw image data from a pixel-array.

DETAILED DESCRIPTION OF THE EMBODIMENTS

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the terms "below" and "under" may encompass both an orientation of above and below. The device may be otherwise oriented (rotated ninety degrees or at other orientations) and the spatially relative descriptors used herein interpreted accordingly. In addition, it will also be understood that when a layer is referred to as being "between" two layers, it may be the only layer between the two layers, or one or more intervening layers may also be present.

Figure 1:
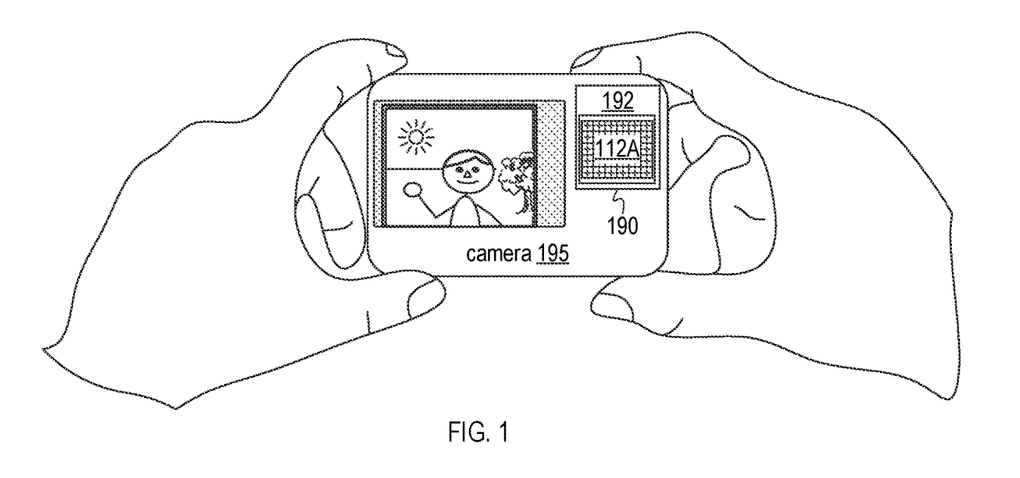
FIG. 1 depicts a camera imaging a scene using an image sensor, in embodiments.

FIG. 1 depicts a camera 195 imaging a scene. Camera 195 includes an image sensor 192, which includes a pixel-array substrate 190. Constituent elements of pixel-array substrate 190 may include at least one of silicon and germanium. Pixel-array substrate 190 includes a pixel-array 112A. Image sensor 192 may part of a chip-scale package or a chip-on-board package. Camera 195 is shown as a component of a handheld device, but it should be appreciated that other devices, such as security devices, automobile cameras, drone cameras, etc. may utilize camera 195 without departing from the scope hereof.

Image sensor 192 captures single-sensor digital camera images (often called "raw" images or data) from pixel-array 112A. Camera images, which may also include video, may be easily manipulated once it is in digital form. In embodiments, a digital watermark may be embedded in an image before it leaves the image sensor, in a way that is invisible in the final image and difficult to change.

Figure 2:
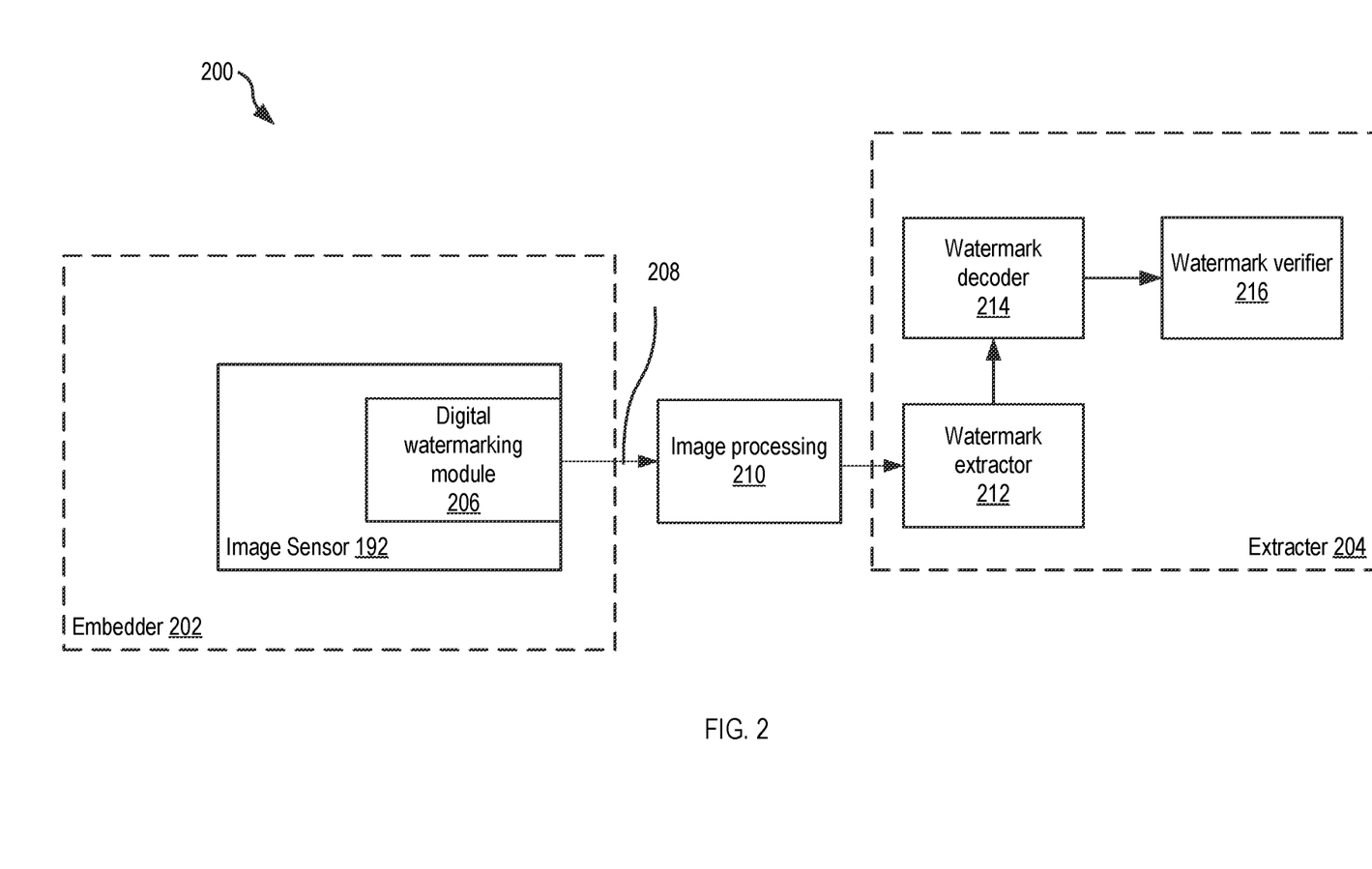
FIG. 2 is a block diagram of a digital watermarking system for use with the image sensor of FIG. 1, in embodiments.

FIG. 2 is a block diagram of a digital watermarking system 200 for use with image sensor 192, in embodiments. Generally, digital watermarking system 200 includes two main components: embedder 202 and extractor 204. Embedder 202 combines digital data captured by images sensor 192 with a watermark using a digital watermarking module 206. Watermarked image 208 leaving embedder 202 is perceptually identical to the image captured by image sensor 192 but includes an embedded digital watermark.

Image processing 210 represents any transmission or processing of watermarked image 208. It may also include efforts, malicious or otherwise, to change the watermarked image 208. Image processing 210 may include, for example, interpolation, gamma correction, stretching, color adjustment or JPEG/H.264/H.265 compression, for example. If image processing 210 is performed by an attacker, the goal may be to modify watermarked image 208 to make it difficult to detect the watermark, or to covertly or overtly corrupt some part of the image. Regardless of the intent of image processing 210, extractor 204 is able to extract the digital watermark and verify the origin of watermarked image 208. Depending on the watermark used, extractor 204 may be able to identify a specific image sensor 192 that captured the image.

Extractor 204 is used to recover the watermark from watermarked image 208 and detect any violation of the integrity of the image captured by image sensor 192. Extractor 204 includes three main elements: watermark extractor 212, where the watermark is extracted from a received image, watermark decoder 214, where a watermark that has been encrypted before embedding is decrypted, and watermark verifier 216, where the extracted and decoded watermark is verified. Although three elements are shown in FIG. 2, this is for purposes of illustration. These elements may be combined in fewer elements, or more may be added, such as error correction or other processes.

Figure 3:
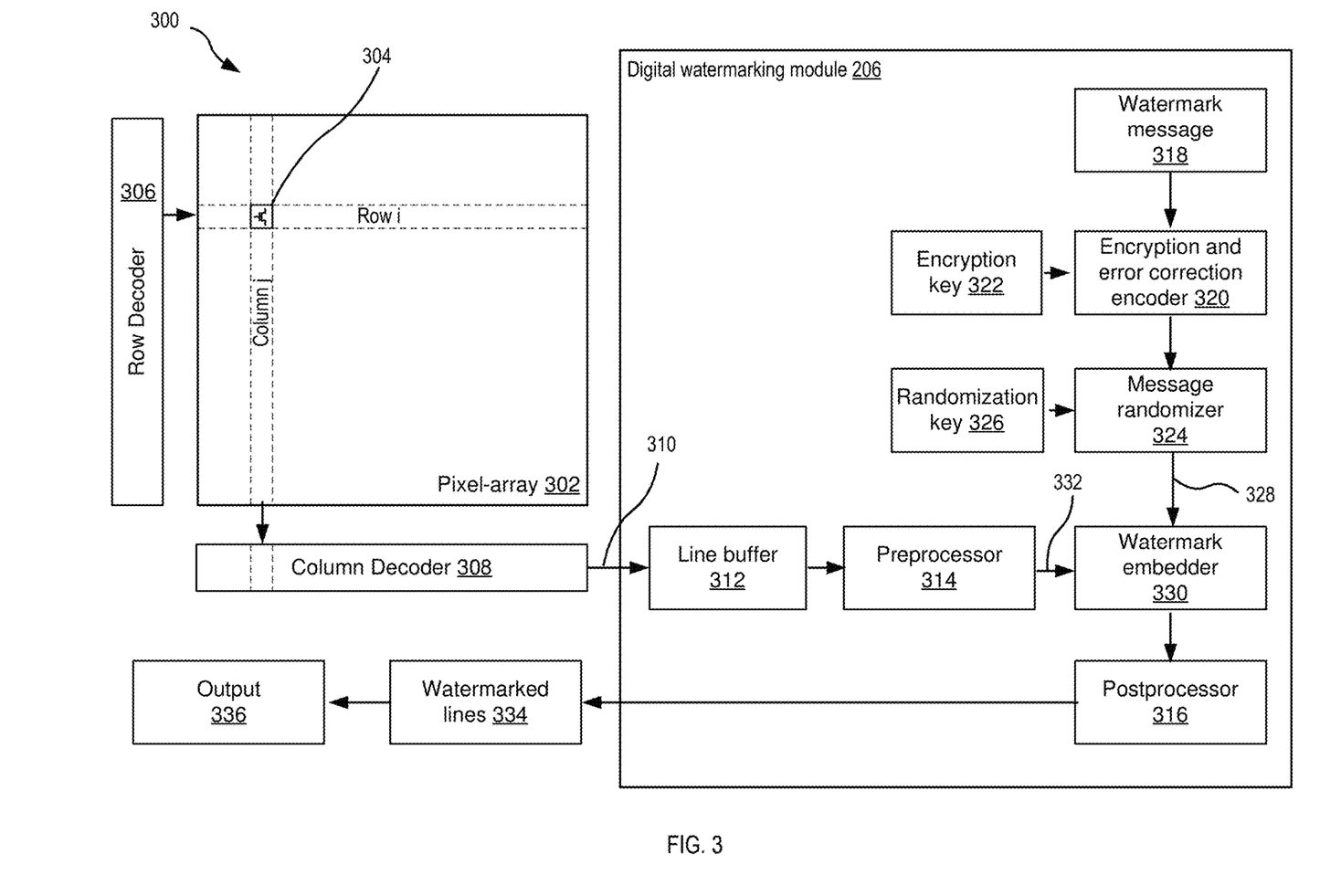
FIG. 3 is a block diagram of the image sensor of FIG. 1 with digital watermarking, in embodiments.

FIG. 3 is a block diagram of an image sensor 300 with digital watermarking, in embodiments. Image sensor 300 is an example of image sensor 192 of FIG. 1. Image sensor 300 includes pixel-array 302, which is an example of pixel-array 112A of image sensor 192. Pixel-array 302 includes rows(i) and columns(j) of pixels 304. Raw image data 310 captured by pixels 304 is read out using row decoder 306 and column decoder 308, then transferred to line buffer 312 in digital watermarking module 206.

Line buffer 312 may be a single line buffer for line embedding of digital watermarks, or a multiple line buffer, for block embedding of digital watermarks. From line buffer 312, a pixel-array output of raw image data 310 is sent to preprocessor 314 to determine preprocessed image coefficients. Preprocessing may include a domain transform like discrete cosine transform (DCT) or discrete wavelet transform (DWT, a Fourier transform, a histogram statistic generation or a singular-value decomposition, for example). In embodiments, the preprocessed image coefficients may be generated by any mathematical transformation and any preprocessing transform, or a combination of different transforms, so long as the selected transformation and/or transform has an inverse, which is used by postprocessor 316. Preprocessor 314 and postprocessor 316 may process one color channel or multiple color channels. A technical benefit of preprocessor 314 is that it allows a digital watermark to be embedded in a different domain of raw image data 310 to add a further layer of protection. Many domain transforms do not result in visible changes to an image.

Watermark message 318 is information that is embedded in raw image data 310. In embodiments, watermark message 318 may be an ID of image sensor 300 or a timestamp indicating when raw image data 310 was captured. Watermark message 318 may also incorporate a value unique to image sensor 300, such as peak signal-to-noise ratio (PNSR) or defect pixel locations, for example. In embodiments, watermark message 318 may be any information associated with pixel-array 302 or image sensor 300, for example.

In embodiments, watermark message 318 may be processed to make it more confidential and robust. Encryption and error correction encoder 320 uses encryption key 322 to encrypt watermark message 318. A variety of encryption methods may be used, such as AES (Advanced Encryption Standard), RSA (Rivest-Shamir-Adleman) or chaotic encryption, for example. After encryption, watermark message 318 may also be processed with an error correcting code, such as a Hamming, RS (Reed-Solomon), BCH (Bose-Chaudhuri-Hocquenghem) or QR (Quick Response) Code. Error correction encoding is used to control errors that may occur in subsequent processing or transmission of image data.

Message randomizer 324 is used to make the encoded watermark message look like random noise so that it is less visible in the final image, if not invisible. Randomization key 326 is used by message randomizer 324.

Watermark embedder 330 combines the digital watermark 328 from message randomizer 324 with coefficients 332 of raw image data 310 after preprocessing. In embodiments, the bit stream of digital watermark 328 is not combined with coefficients 332 directly. Instead, as described in more detail in connection with FIG. 5, random coefficients 506 are selected from coefficients 332. In embodiments, several coefficients 332 may be used to embed a one bit of digital watermark 328. Further, digital watermark 328 may be embedded in insensitive coefficients, such as lesser bits in a group of bits. The lesser bits within a block may not carry as much information therefore, changing these bits has less impact on the quality of the final image.

Postprocessor 316 reverses the effects of preprocessor 314 to generate watermarked image coefficients. Digital watermarking module 206 operates on raw image data 310 in single or multiple lines. After postprocessor 316, watermarked lines 334 are provided as output 336 from image sensor 300 based on the raw image data output by pixel-array 302.

Figure 4:
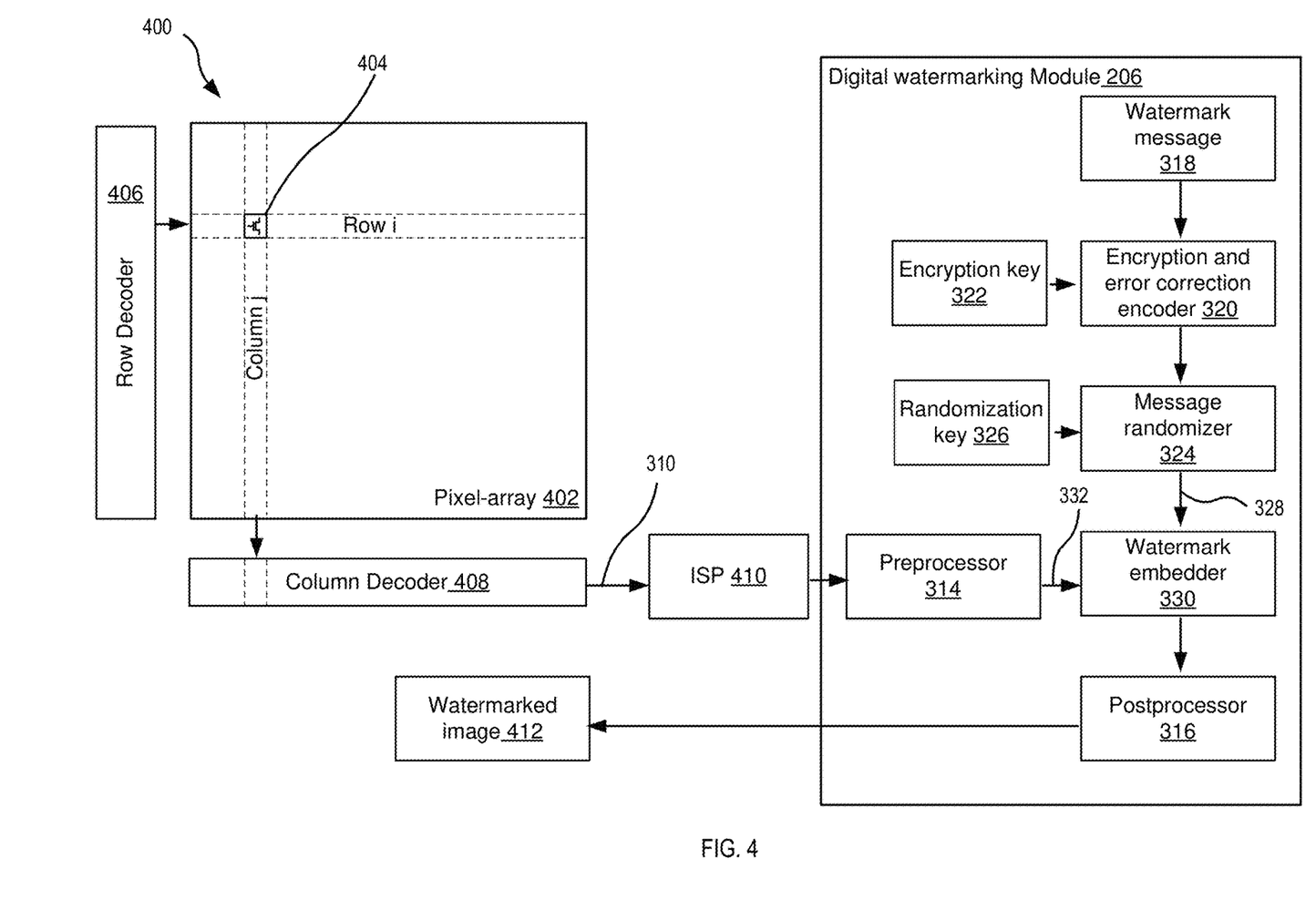
FIG. 4 is a block diagram of the image sensor FIG. 1 with digital watermarking, in embodiments.

FIG. 4 is a block diagram of an image sensor 400 with digital watermarking, in embodiments. Image sensor 400 is an example of image sensor 192 of FIG. 1. Image sensor 400 includes pixel-array 402 of pixels 404, row decoder 406 and column decoder 408 which are examples of pixel-array 302, pixels 304, row decoder 306 and column decoder 308. In the embodiment of FIG. 4, digital watermarking module 206 includes elements as described above for FIG. 3, with like reference numbers indicating like elements. In the embodiment of FIG. 4, encrypted, encoded and randomized watermark message 318 is embedded into a different domain of images that have been processed by image signal processor (ISP) 410. In embodiments, ISP 410 includes processing raw data from pixel-array 402 using algorithms for a Bayer transformation, demosaicing, noise reduction or image sharpening, for example. As shown in FIG. 4, after watermark message 318 is embedded in coefficients from preprocessor 314, a watermarked image 412 is output from image sensor 400.

As disclosed herein, digital watermarking of raw image data is more difficult to break because an attacker needs to know both the encryption method and key, as well as the embedding method used to select image coefficients to receive bits of the digital watermark. Embodiments disclosed herein are also reliable because the digital watermark may still be extracted even after numerous attacks on an image.

Figure 5:
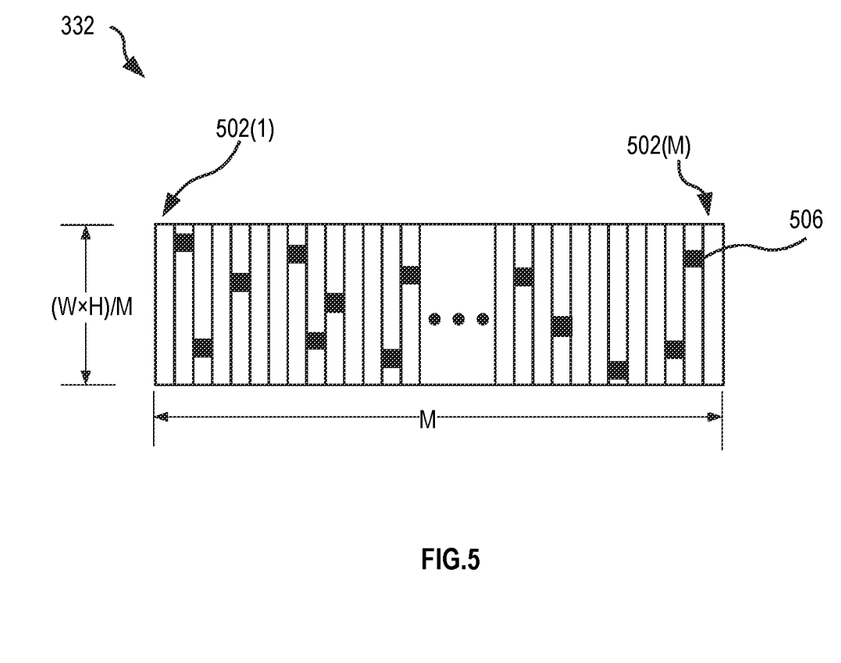
FIG. 5 is a diagram illustrating watermark embedding in image coefficients, in embodiments.

FIG. 5 represents coefficients 332 that have been generated by preprocessor 314. In embodiments, a raw image is captured by a pixel-array with a number of pixels described by W×H pixels. The raw image is preprocessed to generate W×H coefficients 332. Coefficients 332 are divided into M blocks, 502(1) through 502(M). Each coefficient block 502 includes (W×H)/M coefficients.

In embodiments, the randomized watermark message, digital watermark 328, has a length of N bytes. N is determined by the length of watermark message 318 and an error correction algorithm used by Error Correction Encoder 320. In a representative example, watermark message 318 may have a length of 32 bytes. In this example, encryption does not change the length of watermark message 318. In the representative example, error correction encoding triples the length of a 32-byte watermark message to N=96 bytes.

Message randomizer 324 does not change the length of the watermark, so digital watermark 328 has a length of N bytes.

In embodiments, K coefficient blocks 502 selected from coefficient blocks 502(1-M) are used to embed one byte of digital watermark 328. The number K of coefficient blocks is selected to meet the criteria that M>N×K. The N×K embedding blocks are selected from M blocks randomly with a seed S. In embodiments, Encryption Key 322, Randomization Key 326, and Seed S are independent of each other and provided to a user of digital watermarking system 200 including image sensor 192, 300 or 400 in a secure manner.

Figure 6:
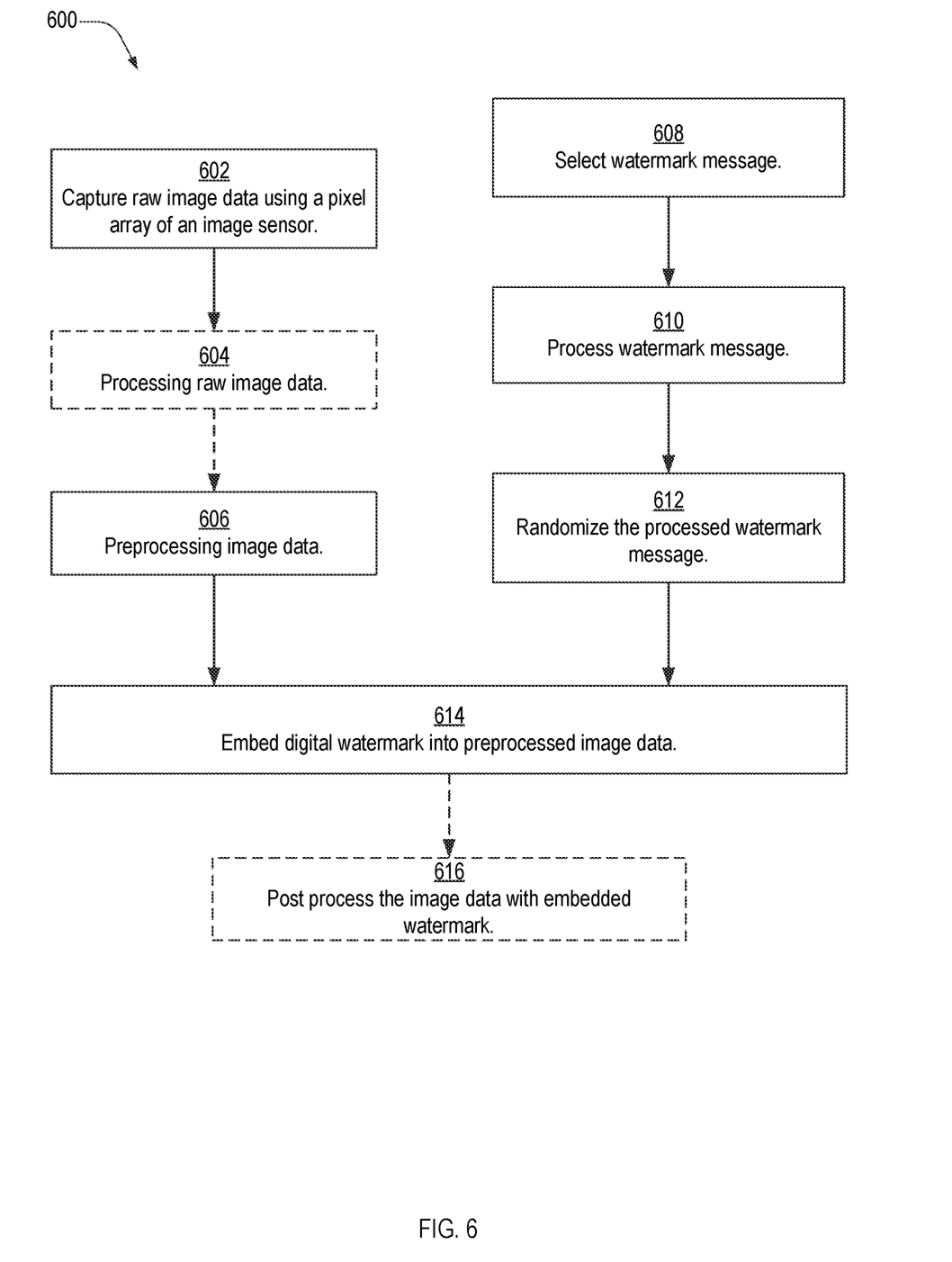
FIG. 6 is a flowchart illustrating a method of embedding a watermark in raw image data, in embodiments.

FIG. 6 is a flowchart illustrating a method 600 of embedding a watermark in raw image sensor data, in embodiments. Method 600 includes steps 602, 606, 608, 610, 612 and 614. In embodiments, method 600 also includes at least one of steps 604 and 616.

Step 602 includes capturing an image using a pixel-array of an image sensor 300. In an example of step 602, raw image data 310 captured by pixels 304 is read out using row decoder 306 and column decoder 308. In embodiments, raw image data 310 is transferred to line buffer 312.

Step 604 includes processing raw image data. In an example of step 604, ISP 410 processes raw data using algorithms such as a Bayer transformation, demosaicing, noise reduction or image sharpening, for example.

Step 606 includes preprocessing image data. In an example of step 606, preprocessing may be performed on raw image data from line buffer 312 or processed data from ISP 410. Preprocessing may include a domain transform like discrete cosine transform (DCT) or discrete wavelet transform (DWT, a Fourier transform, a histogram statistic generation or a singular-value decomposition, for example. In embodiments, generating preprocessing coefficients can be accomplished by any mathematical transformation and any preprocessing transform or a combination of different transforms may be used as long as the selected preprocessing has an inverse used by postprocessor 316.

Step 608 includes selecting a watermark message. In an example of step 608, watermark message 318 may be an ID of image sensor 300, a timestamp or a value unique to image sensor 300, such as peak signal-to-noise ratio (PNSR) or defect pixel locations.

Step 610 includes processing watermark message 318 to make it more confidential and robust. In an example of step 610, watermark message may be encrypted with encryption and error correction encoder 320 using encryption key 322. After encryption, watermark message 318 may also be processed with an error correcting code to control errors that may occur in subsequent processing or transmission of image data.

Step 612 includes randomizing the processed watermark message. In an example of step 612, message randomizer 324 uses randomization key 326 to create a digital watermark from the encrypted watermark message that looks like random noise so that it is less visible in the final image.

Step 614 includes embedding the digital watermark into preprocessed image data. In an example of step 614, watermark embedder 330 combines the digital watermark 328 from message randomizer 324 with coefficients 332 of preprocessed raw image data 310.

Step 616 includes postprocessing the image data with an embedded watermark. In an example of step 616, postprocessor 316 reverses the effects of preprocessor 314.

Figure 7:
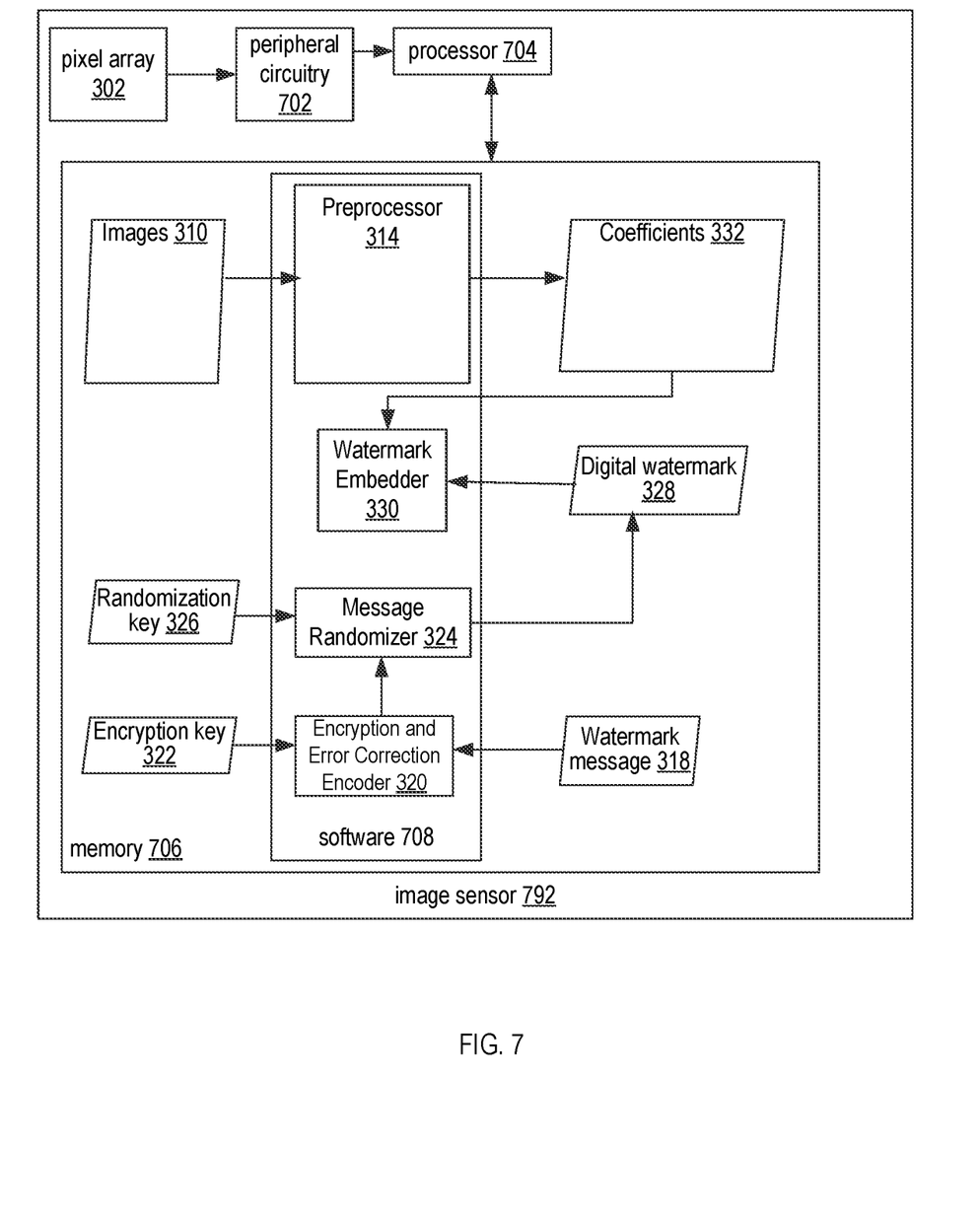
FIG. 7 is a functional block diagram of the image sensor of FIG. 1 with digital watermarking, in embodiments.

FIG. 7 is a functional block diagram of an image sensor 792 with digital watermarking, in embodiments. Image sensor 792 in as an example of image sensor 192, and includes pixel-array 302, peripheral circuitry 702, a processor 704, and a memory 706. In embodiments, processor 704 is not part of image sensor 192, while being communicatively coupled with at least one of peripheral circuitry 702 and memory 706.

In embodiments, at least one of processor 704 and memory 706 are part of peripheral circuitry 702. In embodiments, at least one of processor 704 and memory 706 are communicatively coupled to image sensor 792, while not being part of image sensor 792. In embodiments, memory 706 and processor 704 are part of an application-specific integrated circuit (ASIC) or a field-programmable gate array (FPGA). In embodiments, digital watermarking module 206 includes at least one of processor 704 and memory 706, and may be one of an ASIC and an FPGA. In embodiments, at least part of method 600 is implemented by processor 704 executing machine-readable instructions of memory 706.

In an example mode of operation, pixel-array 302 generates signals from images captured by camera 195. Peripheral circuitry 702 is communicatively coupled to pixel-array 302 and outputs a plurality of pixel values, representing the signals, which memory 706 stores as raw image data 310. Raw image data 310 may represent a single image or a series of images that may be either consecutive images or non-consecutive images captured by camera 195. Memory 706 stores software 708, which includes preprocessor 314, encryption and error correction encoder 320, message randomizer 324 and watermark embedder 330.

Memory 706 may be transitory and/or non-transitory and may include one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). Part or all of memory 706 may be integrated into processor 704.

Embodiments disclosed herein may include one or more processors executing instructions stored in a non-transitory memory.

Combinations of Features

Features described above as well as those claimed below may be combined in various ways without departing from the scope hereof. The following enumerated examples illustrate some possible, non-limiting combinations.

(A1) A method of embedding a digital watermark may include generating preprocessed coefficients from a pixel-array output using a mathematical transform; encrypting a watermark message using a first key; randomizing the encrypted watermark message using a second key to form a randomized watermark; and embedding the randomized watermark in randomly selected preprocessed coefficients to generate image coefficients with an embedded digital watermark.

(A2) In the method of (A1), postprocessing the image coefficients with an inverse of the mathematical transform used to generate the preprocessed coefficients to form a watermarked image; and outputting the watermarked image based on the pixel-array output.

(A3) In the method of (A1) or (A2), generating preprocessed coefficients includes receiving the pixel-array output from a line buffer.

(A4) In the method of (A3), the line buffer comprises a single line or multiple lines.

(A5) In the method of (A3) or (A4), receiving the pixel-array output includes receiving the pixel-array output from an image signal processor.

(A6) The method of (A1)-(A5), generating the preprocessed coefficients includes using the mathematical transform on one color channel or multiple color channels of the pixel-array output.

(A7) The method of (A1)-(A6), wherein the watermark message includes information associated with the pixel-array.

(A8) The method of (A1)-(A7), wherein encrypting the watermark message further comprises performing error correction encoding on the encrypted watermark message.

(A9) The method of (A1)-(A8), wherein embedding the watermark message comprises embedding one bit of the watermark message in a plurality of randomly selected preprocessed coefficients.

(B1) A digital watermarking module includes circuitry that executes a plurality of steps including generating preprocessed coefficients from a pixel-array output using a mathematical transform; encrypting a watermark message using a first key; randomizing the encrypted watermark message using a second key to form a randomized watermark; and embedding the randomized watermark in randomly selected preprocessed coefficients to generate image coefficients with an embedded digital watermark.

(B2) The digital watermarking module of (B1), the circuitry including: a processor, and a memory storing instructions, that when executed by the processor, control the processor to execute the plurality of steps.

(B3) The digital watermarking module of (B1) or (B2), the circuitry further executing a step of postprocessing the image coefficients with an inverse of the mathematical transform used to generate the preprocessed coefficients to form a watermarked image; and outputting the watermarked image based on the pixel-array output.

(B4) The digital watermarking module of (B1)-(B3), the circuitry further executing a step of receiving the pixel-array output from a line buffer.

(B5) The digital watermarking module of (B1)-(B4), circuitry further executing a step of receive the pixel-array output from an image signal processor.

(B6) The digital watermarking module of (B1)-(B5), the circuitry further executing a step of performing at least one transform of the pixel-array output.

(B7) The digital watermarking module of (B1)-(B6), wherein the watermark message comprises information associated with a sensor providing the pixel-array output.

(B8) The digital watermarking module of (B1)-(B7), the circuitry further executing a step of performing error correction encoding after the watermark message is encrypted.

(B9) The digital watermarking module of (B1)-(B8), the circuitry further executing a step of embedding a bit of the watermark in a plurality of randomly selected preprocessed coefficients.

(B10) The digital watermarking module of (B1)-(B9), the circuitry being one of an application-specific integrated circuit and a field-programmable gate array.

(C1) An image sensor including a pixel-array and the digital watermarking module of (B1)-(B10).

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

What is claimed is:

1. A method of embedding a digital watermark, comprising:
    generating preprocessed coefficients from a pixel-array output using a mathematical transform;
    encrypting a watermark message using a first key, wherein the watermark message comprises information associated with the pixel-array or with an image sensor including the pixel-array;
    randomizing the encrypted watermark message using a second key to form a randomized watermark; and
    embedding the randomized watermark in randomly selected preprocessed coefficients to generate image coefficients with an embedded digital watermark.

2. The method of claim 1, further comprising:
    postprocessing the image coefficients with an inverse of the mathematical transform used to generate the preprocessed coefficients to form a watermarked image; and
    outputting the watermarked image based on the pixel-array output.

3. The method of claim 1, wherein generating preprocessed coefficients comprises receiving the pixel-array output from a line buffer.

4. The method of claim 3, wherein the line buffer comprises a single line or multiple lines.

5. The method of claim 1, wherein receiving the pixel-array output further comprises receiving the pixel-array output from an image signal processor.

6. The method of claim 1, wherein generating the preprocessed coefficients further comprises using the mathematical transform on one color channel or multiple color channels of the pixel-array output.

7. The method of claim 1, wherein encrypting the watermark message further comprises performing error correction encoding on the encrypted watermark message.

8. The method of claim 1, wherein embedding the watermark message comprises embedding one bit of the watermark message in a plurality of randomly selected preprocessed coefficients.

9. A digital watermarking module, comprising:
    circuitry that executes a plurality of steps including:
    generating preprocessed coefficients from a pixel-array output using a mathematical transform;
    encrypting a watermark message using a first key, wherein the watermark message comprises information associated with the pixel-array or with an image sensor including the pixel-array;
    randomizing the encrypted watermark message using a second key to form a randomized watermark; and
    embedding the randomized watermark in randomly selected preprocessed coefficients to generate image coefficients with an embedded digital watermark.

10. The digital watermarking module of claim 9, the circuitry further comprising: a processor, and a memory storing instructions, that when executed by the processor, control the processor to execute the plurality of steps.

11. The digital watermarking module of claim 9, the circuitry further executing a step of:
    postprocessing the image coefficients with an inverse of the mathematical transform used to generate the preprocessed coefficients to form a watermarked image; and
    outputting the watermarked image based on the pixel-array output.

12. The digital watermarking module of claim 9, the circuitry further executing a step of receiving the pixel-array output from a line buffer.

13. The digital watermarking module of claim 9, the circuitry further executing a step of receive the pixel-array output from an image signal processor.

14. The digital watermarking module of claim 9, the circuitry further executing a step of performing at least one transform of the pixel-array output.

15. The digital watermarking module of claim 9, the circuitry further executing a step of performing error correction encoding after the watermark message is encrypted.

16. The digital watermarking module of claim 9, the circuitry further executing a step of embedding a bit of the watermark in a plurality of randomly selected preprocessed coefficients.

17. The digital watermarking module of claim 9, the circuitry being one of an application-specific integrated circuit and a field-programmable gate array.

18. An image sensor comprising:

a pixel-array; and digital watermarking module comprising circuitry that executes a plurality of steps including:

generating preprocessed coefficients from an output of the pixel-array using a mathematical transform;

encrypting a watermark message using a first key, wherein the watermark message comprises information associated with the pixel-array or the image sensor;

randomizing the encrypted watermark message using a second key to form a randomized watermark; and embedding the randomized watermark in randomly selected preprocessed coefficients to generate image coefficients with an embedded digital watermark.

\* \* \* \* \*